UNITED STATES PATENT OFFICE.

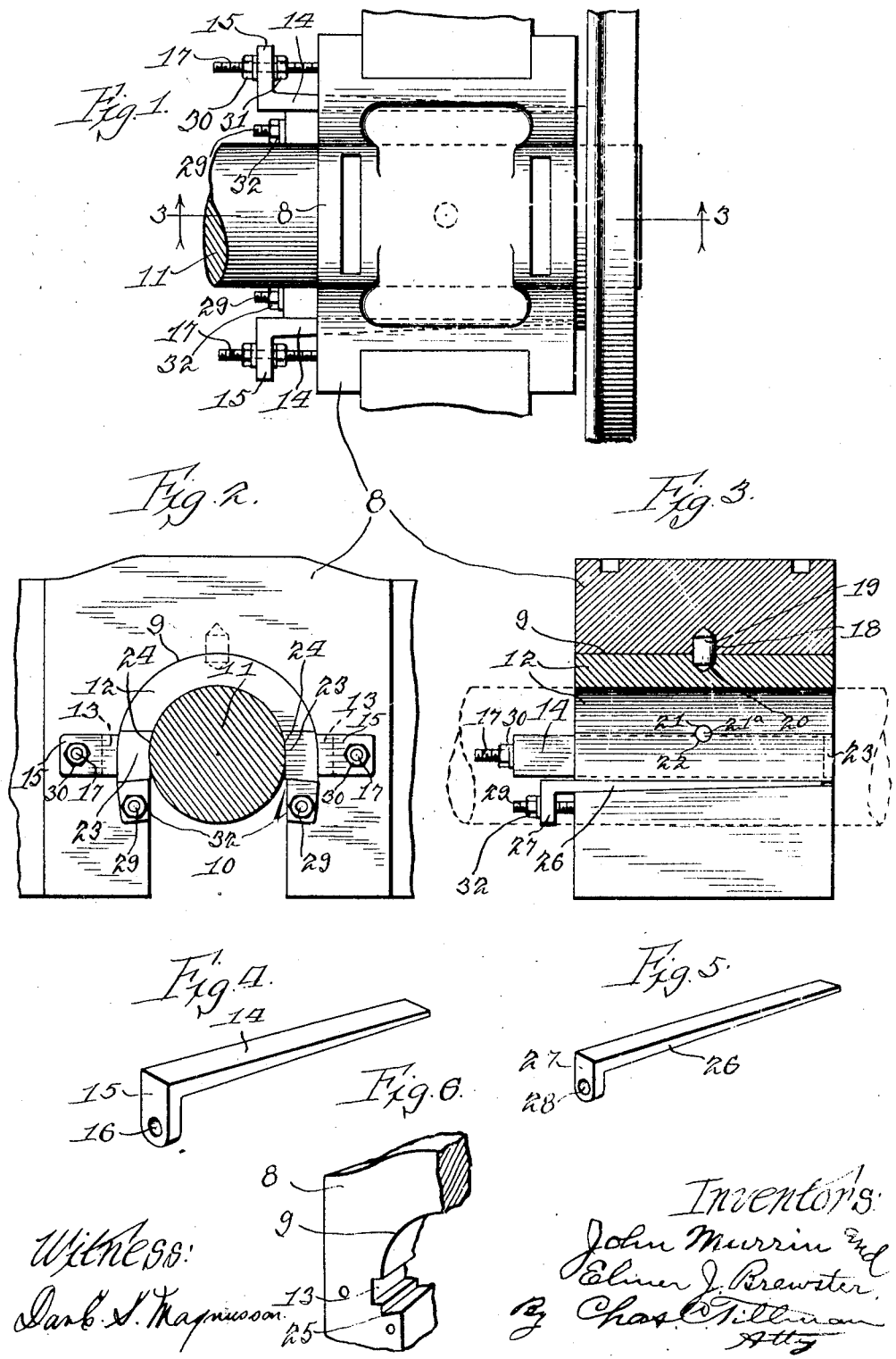

JOHN MURRIN AND ELMER J. BREWSTER, OF CHICAGO, ILLINOIS.

ADJUSTABLE JOURNAL-BEARING.

1,342,059.   Specification of Letters Patent.   Patented June 1, 1920.

Application filed September 26, 1919. Serial No. 326,558.

*To all whom it may concern:*

Be it known that we, JOHN MURRIN and ELMER J. BREWSTER, citizens of the United States, residing at Chicago, in the county of Cook and State of Illinois, have invented certain new and useful Improvements in Adjustable Journal-Bearings, of which the following is a specification.

Our invention relates to improvements in journal bearings used in the locomotive driving boxes on all axles of locomotive engines, and it consists in certain peculiarities of the construction, novel arrangement, combination and operation of the various parts thereof, as will be hereinafter more fully set forth and specifically claimed.

The principal object of the invention is to provide a journal bearing of the above mentioned general character, which shall be simple and inexpensive in construction, strong, durable and highly efficient in operation, with its parts so made and operatively arranged that they can be readily and suitably adjusted in order to take up or compensate for the wear thereof incident to continuous usage, and particularly the wear in the horizontal direction, which as is well known to engineers, causes "pounding" of the axles in the main driving boxes.

Another object is to provide an adjustable journal bearing which can be readily fitted to or used in connection with the driving boxes on the axles of locomotives of the usual or well known construction now and heretofore in general use, without removal of the same from their mountings on the frame of the engine, and with but slight alteration to the bearing surfaces of said boxes.

Other objects and advantages of the invention will be disclosed in the following description and explanation.

In the accompanying drawing which serves to illustrate an embodiment of the invention—

Figure 1 is a plan view of a driving box equipped with a journal bearing of our improved construction showing a portion of an axle of a locomotive positioned in said bearing and illustrating a portion of a driving wheel mounted on said axle.

Fig. 2 is an inner face view of the driving box and bearing.

Fig. 3 is a central sectional view through the box and bearing taken on line 3—3 of Fig. 1 looking in the direction indicated by the arrows.

Figs. 4 and 5 are detached perspective views of tapered keys used for adjusting certain members of the bearing, and Fig. 6 is a fragmental perspective view of the driving box showing the construction of the bearing surface thereof.

Like numerals of reference refer to like parts throughout the different views of the drawing.

The reference numeral 8 designates, as a whole, the driving box which may, in general, be of the ordinary or well known construction, such as those used on the main axles of locomotive engines, and said box may be supported by any suitable means or in the usual manner on the frame of the engine. This box is provided transversely thereof with an arcuate or substantially semi-circular opening 9 which has communicating therewith a vertically extended opening 10, the walls of which are located in parallelism with one another and extend upwardly in the box to a suitable distance below a horizontal line drawn diametrically through the axle 11 of the engine which is located and operates in the space provided by the circular opening 9 and the upper portion of the opening 10, as will be presently explained. The lower portion of the opening 10 communicates with an oil cellar in the usual manner.

As is clearly shown in Figs. 2, 3 and 6 of the drawing, a segmental crown piece 12 of brass is located in the curved bearing or recess 9 of the driving box and the edges of the piece or crown 12 terminate by preference a slight distance above a horizontal line drawn diametrically through the axle or journal 11. The wall of the opening 9 is provided with diametrically opposed recesses 13 which are by preference rectangular in shape and are for the reception and operation of adjusting keys 14, one of which is located in each of said recesses, as will be readily understood by reference to Figs. 1, 2 and 3 of the drawing.

Each of the keys 14 is provided at one of its ends with a lateral extension or head 15 and is tapered from said head to its other end as is clearly shown in Fig. 4 of the drawing. Each of the extensions or members 15 is provided with an opening 16 for the reception of screw bolts 17 which are tapped in suitable openings in the inner face of the box 8 and project horizontally therefrom on a horizontal diametrical line through the axle or journal 11, see Fig. 2 of the drawing.

The box 8 is provided at about the middle thereof with an opening or recess 18, which is extended radially from the inner surface of the bearing surface 9 outwardly a short distance in the box and is for the reception of one end of a pin 19, the other end of which is located in a radially disposed opening 20 in the periphery of the crown piece 12 about midway between its ends and side edges.

At about midway between the ends of each of its side edges the crown piece 12 is provided with a transversely extended semicircular opening 21, each of which is adapted to register with a similarly formed recess 22 located transversely in the upper surface of each of the adjustable quarter brasses or pieces 23 at about midway between their ends, which pieces are substantially rectangular in cross-section and are of sufficient length to extend from one end of the bearing opening 9 to the other end thereof and as shown in Fig. 2, are located one on each side of the journal or axle 11 with their upper surfaces in contact with the lower portions of the crown piece 12.

It will be further understood that the quarter brasses or pieces 23 are located inwardly of the keys 14, and are of somewhat greater width than said keys and the recesses 13, in which the keys are located. It will also be noted that the inner surface of each of the members 23 is provided with an arc 24 which extends from the upper surface of said member downwardly to a point slightly below a horizontal line drawn diametrically through the axle.

Just below each of the recesses 13 in the wall of the bearing opening 9, said wall is provided with another recess 25, (see Fig. 6) which is for the reception of tapered locking keys 26, one of which is located in each of the recesses 25 below the quarter brass 23 therein, and in contact with the lower surface of said brass piece or member, as is clearly shown in Fig. 3 of the drawing. Each of the keys 26 is provided at one of its ends with a head or lateral extension 27, which has an opening 28 for the reception of a screw bolt 29, which are tapped in suitable openings in the inner face of the box 8 and extend horizontally therefrom just below the recesses 25 in the bearing opening or surface of said box.

Transversely located in the recesses 21 and 22 of the crown piece 12 and quarter pieces 23 respectively, are pins 21$^a$ which will prevent longitudinal movement of said members with respect to one another when the adjustment of said pieces by means of the tapered keys takes place. It is also obvious that the pin 19 engaging the recess 18 of the box 8 and the recess 20 in the periphery of the crown piece 12 will prevent longitudinal or lateral movement thereof.

Each of the screw bolts 17 has mounted thereon a pair of nuts 30 and 31 to engage the extensions or heads 15 of the tapered keys 14 which heads are located between said nuts as is clearly shown in Fig. 1 of the drawing. By this arrangement, it is apparent that as wear of the parts of the bearing and the journal takes place, the same can be taken up by moving the keys 14 in the proper directions, where the keys 14 may be fixedly held by means of the nuts 30 and 31 which can be properly adjusted to clamp the heads 15 of said keys. It is also obvious that the keys 26 may be held in proper position by means of the nuts 32, one of which is mounted on each of the screw bolts 29 for this purpose, and that said keys 26 will thereby lock the members 23 in place.

While we have shown the crown piece 12 provided in its periphery with a recess 20 and the box 8 with a recess 18 to register with the recess 20, and for the reception of a pin 19 to hold the crown piece in the box against longitudinal or lateral movement, and while we have shown the lower edges of the crown piece provided with transversely extended recesses 21 and the quarter pieces 23 with transversely extended recesses 22 to register with the recesses 21, and for the reception of pins 21$^a$ to hold the quarter pieces against longitudinal movement with respect to the crown piece, yet we do not desire to be limited to the above means of connecting said members or elements, as we may employ any other desirable means for such purpose without departing from the spirit of our invention.

Having thus fully described our invention, what we claim as new and desire to secure by Letters Patent is—

1. In an adjustable journal bearing, the combination with a box provided with a bearing opening for the journal and having in the walls of said opening a pair of opposed recesses diametrically and horizontally disposed with respect to the journal, said bearing opening also having in each of its lateral walls a recess located below each of the first named recesses, of a segmental crown piece located in the upper portion of said bearing opening, a quarter piece located in contact with the lower surface of each side of said crown piece and inwardly of each of the first named recesses, a lockable tapered key adjustably located in each of the recesses at the outer surfaces of said quarter pieces and a tapered key lockably located in each of the recesses below the quarter pieces.

2. In an adjustable journal bearing, the combination with a box provided with a bearing opening for the journal and having in the walls of said opening a pair of opposed recesses diametrically and horizontally disposed with respect to the journal, said bearing opening also having in each of its lateral walls a recess located below each of the first named recesses, a segmental crown piece located in the upper portion of said bearing opening, a quarter piece located in contact with the lower surface of each side of said crown piece and inwardly of each of the first named recesses, a screw bolt mounted on one of the faces of the box and extended horizontally therefrom near each of the first named recesses, and a screw bolt mounted on the box and extended horizontally therefrom just below each of the lower recesses therein, a tapered key adjustably located in each of the recesses at the outer surface of said quarter pieces and a tapered key adjustably located in each of the recesses below the quarter pieces, each of said keys having an apertured lateral extension engaging said screw bolts, and means on said bolts for holding said keys in their adjusted positions.

In witness whereof we have hereunto signed our names at Chicago, Illinois, on this the 23d day of September, 1919.

JOHN MURRIN.
ELMER J. BREWSTER.

Witnesses:
F. J. RAVLIN,
ERWIN H. C. FREITAG.